Nov. 12, 1957 E. C. LUSK ET AL 2,812,757
APPARATUS FOR DETECTING PHYSIOLOGICAL CONDITIONS
Filed June 8, 1954
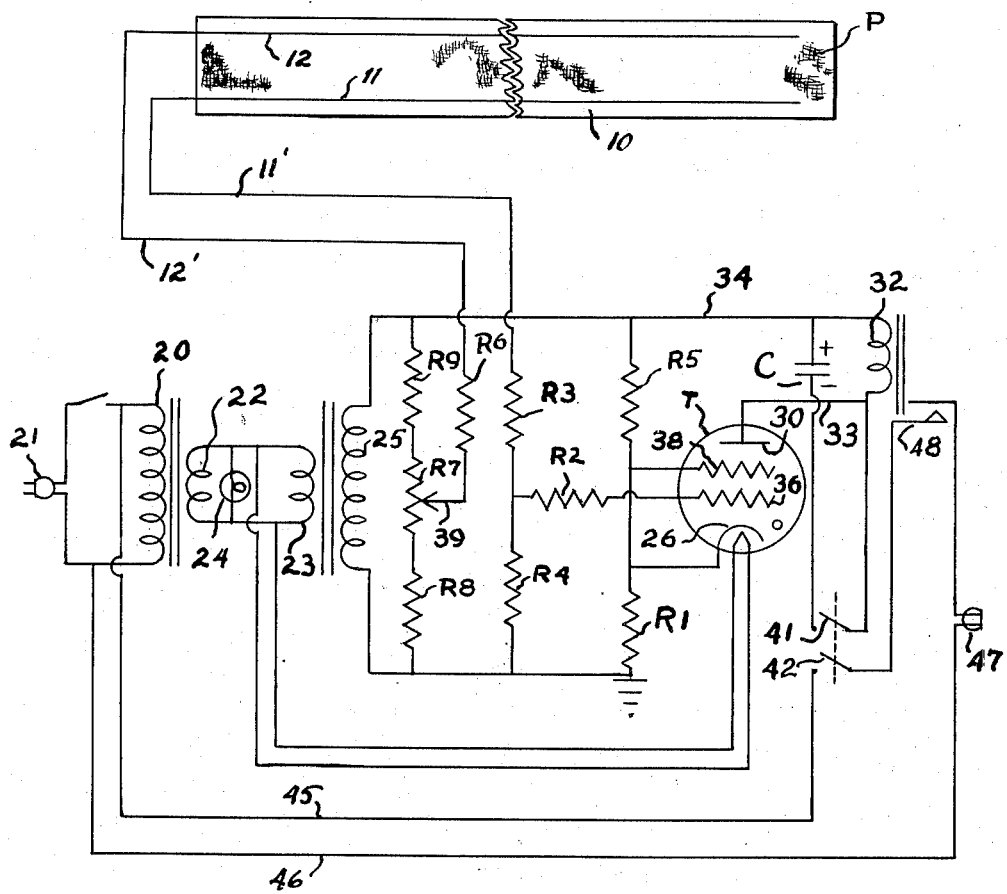
INVENTORS
ELMER C. LUSK
WOODROW F. BATES
BY
Attorney

United States Patent Office 2,812,757
Patented Nov. 12, 1957

2,812,757

APPARATUS FOR DETECTING PHYSIOLOGICAL CONDITIONS

Elmer C. Lusk and Woodrow F. Bates, Columbus, Ohio; said Bates assignor to said Lusk Application June 8, 1954, Serial No. 435,282

5 Claims. (Cl. 128—2)

The present invention relates to a method and apparatus for the detection of physiological conditions of the human body which are manifested by an increase in the rate of perspiration, such as insulin reaction in diabetics.

The principal object of the invention is the provision of a new method and apparatus by which the commencement of an insulin reaction in a diabetic can be detected in time to take appropriate measures to counteract the reaction before discomfort or critical reactions occur in the patient.

Another object of the invention is the provision of a new method of detecting a change in the physiological condition of a person which comprises detecting the normal perspiration rate of a patient by an instrument sensitive to the electrical resistance of the perspiration on the skin of the person, adjusting the instrument to become insensitive to the resistance occasioned by the normal perspiration rate but sensitive to a resistance of lesser value resulting from an increase in rate of perspiration.

Another object of the invention is the provision of a signaling instrument responsive to a predetermined electrical resistance offered by perspiration between two points on the skin of a person to provide a signal, the device having means for adjusting the sensitivity thereof whereby it may be compensated to be unresponsive, i. e. give no signal, to the normal perspiration of any particular patient at any given time, but which will respond to a decrease in resistance due to an increase in the rate of perspiration.

A further object of the invention is the provision of a probe for an electrical resistance responsive instrument of the type referred to which can be placed under the bedding of a patient to provide an electric current path which includes perspiration between two points on the skin of the patient lying in the bed and to the resistance of which determines the response of the instrument.

Other objects and advantages of the invention will be apparent from the following description of a preferred embodiment, reference being made to the accompanying drawing showing diagrammatically an instrument for sounding an alarm or signal in response to an increase above normal of the perspiration of a patient.

In the preferred embodiment of the invention, an instrument is provided for detecting an increase in the perspiration rate of a patient, such as a diabetic. The invention has particular utility in sounding a warning during the sleeping period of a diabetic when the patient is apt to suffer an insulin reaction without becoming aware of the difficulty. Other uses of the invention will suggest themselves and they are not discussed in detail here.

In the form of the invention shown, a probe P is provided comprising a cloth-like tape 10 having conductors 11, 12 which extend parallel and lengthwise of the tape. The tape 10 is placed beneath the bottom bed sheet of the patient's bed and preferably is of sufficient length to extend across the bed. The tape may be formed of any suitable flexible cloth-like material, preferably material impervious to moisture is used since it dries quickly after use.

In the preferred form of the invention, the conductors 11, 12 comprise painted strips of powdered silver in a lacquer vehicle, the strips being spaced to provide a suitable resistance path through perspiration therebetween when employed as described hereinafter. The conductors 11, 12 are connected with wires 11', 12' respectively of a shielded cable which is connected with the detector circuit of a detector described hereinafter.

Alternatively, the probes 11, 12 may comprise wires resistant to corrosion by perspiration and may be woven or otherwise secured lengthwise of the tape in parallel relation as described with reference to the painted probes. The wires may be of an alloy known as "Chromel," which comprises chrome, nickel and iron, although any suitable stainless conductor could be used. The painted conductors are preferred since they do not break, and any defects which occur therein are gradual and can be detected by a diminution in effectiveness thereof over a number of days of usage.

With the tape 10 positioned in the bed as described, and the patient lying thereon, perspiration soon works through the patient's bed clothes and the sheet and makes contact with the conductors 11, 12. This perspiration and the perspiration on the skin of the patient forms an electrical path between the conductors, and the resistance in this path is a function of the amount of perspiration given off the patient. Normally, the perspiration is carried off or dissipated by the bed clothing so that the concentration of perspiration forming the resistance path remains substantially constant for a given rate of perspiration. Should the perspiration rate increase, however, the resistance between the conductors decreases, and the present invention contemplates the use of an instrument which is sensitive to changes in the electrical resistance between the conductors to provide an alarm and which can be preset to be insensitive to the resistance occurring during normal perspiration of a given person and which will then be sensitive to a decrease in the resistance caused by increased perspiration to give an alarm.

Any suitable electric resistance detector instrument may be employed, and in the form of the invention shown such instrument comprises a detector tube T adapted to respond to a decrease in resistance between the conductors 11, 12 to energize a relay R which closes an alarm circuit as described more fully hereinafter. The instrument is preferably housed in a suitable casing, not shown, which may be placed on a table besides the bed, for example.

Although the instrument may be designed to operate on power from various sources, in the form shown it is adapted to operate on the wall outlet known and commonly available 115 v. 60 cycle A. C. current. To prevent power line interference and to furnish low voltage for the grid tube, the instrument has a transformer having the primary 20 thereof connected to the source by a common plug 21 and a secondary 22 connected in circuit with a primary coil 23 which induces 115 v. in an output secondary coil 25. As indicated by the drawing, coils 22 and 23 have considerably fewer turns than primary 20 and provide low voltage for an electric lamp 24 which indicates that the instrument is energized. This circuit also furnishes filament voltage for the tube as indicated.

The secondary coil 25 is grounded to the chassis. The tube is preferably a type known in the trade as 2D21. The plate 30 of the tube is connected with a coil 32 of the relay R by wire 33, and the relay coil is connected by wire 34 with the other side of the output coil 25.

A grid 36 of the tube is connected with the conductor 11 of the probe P through resistors R2, R3, and the wire 11' of the shielded cable, and is connected to ground through resistor R4. A suppressor grid 38 is connected with the cathode, and with wire 34 between the relay coil 32 and the coil 25 through resistor R5. The cathode is connected to common ground through resistor R1.

The conductor 12 is connected to a potentiometer, comprising a resistor R6 and a movable contact 39, by wire 12' of the shielded cable, and a network of resistors R7, R8 and R9 are connected in the circuit of the potentiometer as indicated.

In the example of instrument described, the values for the various resistances may be as follows: R1, 1K; R2, 1M; R3, 1M; R4, 1M; R5, 22K; R6, 22K; R7, 25K; R8, 56K; R9, 5.6M. With the values described, the tube T will "trigger" a charge sufficient to energize the relay coil 32 and operate the relay when the resistance between the probes 10, 11 falls to 50 K. ohms or less.

The relay coil 32 is adapted to actuate an armature connected to normally open contacts 41, 42. Contacts 41, 42 are connected in a 115 v. circuit including wires 45, 46 which is adapted to energize a signal device 47 which may be a buzzer, bell, or light, for example. The signal device may be located wherever desired; for example, it may be beside the patient, in another room of the house, or at a central station in a hospital.

In the form of the invention shown, the relay coil 32 closes a contact 48 in the circuit of the alarm 47 when the coil is energized and a condenser C is connected across the coil through contactor 41 to hold the relay contacts 41, 42, 48 closed. If a pulsating current is desired in the signal circuit, the condenser and contacts 41, 42 are omitted and the contact 48 may be used alone to control the signal.

In use, the probe P is placed beneath the bed sheet upon which the patient lies. The instrument is then energized and the contact 39 of the potentiometer is adjusted so that the signal is inoperative under normal perspirating conditions. The patient may then perspire at a normal rate and the instrument will remain insensible to this perspiration.

Should perspiration increase, however, the resistance between the conductors of the probe decreases and the alarm will be energized, awaking the patient or an aide so that steps can be taken to meet the conditions responsible for the increase in perspiration rate.

While we have described but one form of the invention, other forms may be adopted all falling within the scope of the following claims.

We claim:

1. In apparatus for detecting the change in perspiration rate of a person comprising an electrically operable signal, detector means for energizing said signal in response to a gradual reduction in resistance beyond a predetermined value, and conductor means connected with said detector means comprising a tape of cloth-like material and two spaced conductors attached to said tape and extending generally parallel lengthwise of said tape.

2. Apparatus defined in claim 1 characterized by the conductors comprising flakes of current conducting material held to the fabric by a paint-like coating in which said flakes are suspended.

3. Apparatus as defined in claim 1 characterized by the conductors comprising wire strands stitched or woven in said fabric.

4. Apparatus defined in claim 1 in which detector means for energizing the signal is responsive to decreases in resistance in the range of from 0 to 50 K. ohms.

5. In apparatus for detecting insulin reactions comprising an electrically operable signal, detector means for energizing said signal in response to a gradual reduction in resistance beyond a predetermined value, two spaced conductors connected with said detector means and a perspiration-absorbing sheet-like material interposed between said conductors and the skin of a patient.

References Cited in the file of this patent

UNITED STATES PATENTS

| | | |
|---|---|---|
| 1,989,282 | Kimble | Jan. 29, 1935 |
| 2,535,249 | Wilhelm | Dec. 26, 1950 |
| 2,684,670 | Mathison | July 27, 1954 |
| 2,716,979 | Pouret | Sept. 6, 1955 |